(12) United States Patent  
Sevindik

(10) Patent No.: US 11,991,649 B2
(45) Date of Patent: May 21, 2024

(54) POWER BUDGET CONTROL VIA WIRELESS COMMUNICATION MANAGEMENT

(71) Applicant: Charter Communications Operating, LLC, St. Louis, MO (US)

(72) Inventor: Volkan Sevindik, Reston, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 239 days.

(21) Appl. No.: 17/405,399

(22) Filed: Aug. 18, 2021

(65) Prior Publication Data

US 2023/0058257 A1 Feb. 23, 2023

(51) Int. Cl.
*H04W 4/00* (2018.01)
*H04W 16/28* (2009.01)
*H04W 52/02* (2009.01)
*H04W 52/36* (2009.01)

(52) U.S. Cl.
CPC ......... *H04W 52/367* (2013.01); *H04W 16/28* (2013.01); *H04W 52/0206* (2013.01)

(58) Field of Classification Search
CPC . H04W 52/02; H04W 52/0206; H04W 52/34; H04W 52/36
See application file for complete search history.

(56) References Cited

U.S. PATENT DOCUMENTS

| | | | | |
|---|---|---|---|---|
| 9,807,672 B1* | 10/2017 | Singh | ..................... | H04L 5/0098 |
| 2005/0085279 A1* | 4/2005 | Aoki | ................. | H04W 52/0219 |
| | | | | 455/574 |
| 2007/0184863 A1* | 8/2007 | Takagi | ................ | H04W 52/346 |
| | | | | 455/507 |
| 2011/0171930 A1* | 7/2011 | Yoon | .................. | H04W 52/0206 |
| | | | | 455/405 |
| 2011/0263294 A1* | 10/2011 | Kim | .................. | H04W 52/0296 |
| | | | | 455/558 |
| 2012/0115430 A1* | 5/2012 | Hawkes | .................. | H04W 4/90 |
| | | | | 455/404.1 |
| 2019/0281477 A1* | 9/2019 | Ding | ..................... | H04W 52/02 |
| 2019/0394664 A1* | 12/2019 | Sun | ...................... | H04B 7/0695 |

(Continued)

OTHER PUBLICATIONS

Bhondge et al., Strategy for Power Consumption Management at Base Transceiver Station, 2016, IEEE, pp. 1-4. (Year: 2016).*

*Primary Examiner* — Elisabeth Benoit Magloire

(74) *Attorney, Agent, or Firm* — Armis IP Law, LLC

(57) ABSTRACT

A communication system includes a first wireless base station supporting communications with multiple mobile communication devices. The first wireless base station is limited to an amount of power it is able to consume. For example, the wireless base station receives power consumption information from a power consumption manager. To control power consumption with respect to the received power consumption information, the wireless base station determines (such as based on an estimation, calculation, measurement, etc.), an amount of a power consumption by the wireless base station while communicating with multiple mobile communication devices. The wireless base station adjusts wireless communications transmitted from the wireless base station to maintain the power consumption of the wireless base station with respect to a power consumption limit as indicated by the received power consumption information.

31 Claims, 10 Drawing Sheets

(56) References Cited

U.S. PATENT DOCUMENTS

| | | | | |
|---|---|---|---|---|
| 2020/0084735 A1* | 3/2020 | Cheng | ............. | H04W 24/10 |
| 2020/0314934 A1* | 10/2020 | Raghavan | ............. | H04W 76/15 |
| 2020/0374770 A1* | 11/2020 | Vivanco | ............. | H04W 76/12 |
| 2021/0100059 A1* | 4/2021 | Xu | ............. | H04B 7/0695 |
| 2021/0160698 A1* | 5/2021 | Sevindik | ............. | H04W 28/16 |
| 2021/0175755 A1* | 6/2021 | Lee | ............. | B60L 58/10 |
| 2021/0219144 A1* | 7/2021 | Schwengler | ............. | H04W 74/00 |
| 2021/0266914 A1* | 8/2021 | Yoo | ............. | H04L 5/0025 |
| 2021/0368440 A1* | 11/2021 | Landis | ............. | H04W 72/23 |
| 2022/0022236 A1* | 1/2022 | Li | ............. | H04W 72/23 |
| 2022/0279440 A1* | 9/2022 | Sevindik | ............. | H04L 12/2801 |
| 2022/0295406 A1* | 9/2022 | Ishikura | ............. | H04W 52/02 |
| 2023/0007594 A1* | 1/2023 | Saadi | ............. | H04W 52/367 |
| 2023/0027690 A1* | 1/2023 | Sevindik | ............. | H04W 52/0203 |

* cited by examiner

POWER BUDGET CONTROL VIA WIRELESS COMMUNICATION MANAGEMENT

BACKGROUND

Conventional wireless networks typically include one or more wireless base stations to provide mobile communication devices access to a remote network such as the Internet. One type of base station is a so-called CBSD (Citizen Broadband Radio Service Device). Such a device uses a wireless channel allocated from a CBRS (Citizens Band Radio Service) to support communications with one or more mobile communication devices.

Typically, one or more wireless channels is allocated to a base station by a SAS (Spectrum Access System) to support communications with one or more mobile communication devices or so-called customer premises equipment. For example, a base station can be configured to communicate with the SAS to receive notification of one or more wireless channels allocated for its use.

Subsequent to wireless channel allocation, the wireless base station communicates so-called heartbeat request messages to the spectrum access system in order to continue use of the allocated one or more wireless channels. For example, the customer premises equipment is able to continue using the allocated wireless channel if the SAS communicates a heartbeat response to the customer premises equipment.

In a CBRS system, the SAS (Spectrum Access System) is used to allocate (authorize/unauthorize) radio resources to CBSDs based on request from CBSD; the spectrum allocation/grant to the CBSD can be in a chunks of 10 MHz or 20 MHz and up to 100 MHz assuming LTE operation.

BRIEF DESCRIPTION OF EMBODIMENTS

Embodiments herein provide novel ways of providing improved wireless communications to one or more communication devices in a network environment.

For example, in one embodiment, a communication system as discussed herein includes a wireless base station supporting communications with multiple mobile communication devices. The wireless base station is limited to an amount of power it consumes. For example, the wireless base station receives power consumption information. To control power consumption with respect to the received power consumption information, the wireless base station determines (such as based on an estimation, calculation, measurement, etc.) an amount of a power consumption by the wireless base station while communicating with multiple mobile communication devices. The wireless base station adjusts wireless communications (such as based on one or more parameters) transmitted from the wireless base station to maintain the power consumption of the wireless base station with respect to the received power consumption information. Adjustment of the power consumption can include increasing or decreasing a magnitude of the power consumption by the wireless base station.

In further example embodiments, the power consumption associated with the wireless base station can be adjusted in any suitable manner. For example, embodiments herein include, via the wireless base station, implementing first wireless beamforming settings to communicate with the multiple mobile communication devices. Adjustment of the one or more parameters associated with the wireless communications includes adjustment of the wireless beamforming settings. Beamforming adjustments may result in increased power consumption or decreased power consumption by the wireless base station.

Further embodiments herein include, via the communication management hardware, comparing the determined current level of power consumption to the power consumption information. The communication management hardware associated with the wireless base station implements appropriate measures to stay within power limitations as specified by the power consumption information.

In further example embodiments, the wireless base station as discussed herein establishes respective wireless connectivity with multiple mobile communication devices. For example, the wireless base station establishes a first wireless beam to communicate with a first mobile communication device of the mobile communication devices. The wireless base station establishes a second wireless beam to communicate with a second mobile communication device of the mobile communication devices. In one embodiment, adjustment of the wireless communications from the wireless base station includes replacing the first wireless beam and the second wireless beam with a third wireless beam conveying communications to the first mobile communication device and the second mobile communication device.

In further example embodiments, the wireless base station controls its respective power consumption and corresponding communication control based on location information associated with one or more mobile communication devices (wireless stations) in the wireless network environment. For example, in one non-limiting example embodiment, the wireless base station receives location information indicating respective locations of the mobile communication devices. The location information can be received from any suitable resource such as the mobile communication devices or other entity in the network environment. The wireless base station adjusts one or more parameters associated with transmitting/receiving wireless communications based on the location information. For example, in one embodiment, the wireless base station adjusts wireless beamforming settings associated with wireless connectivity between the wireless base station and the multiple mobile communication devices based on the location information.

Additionally, or alternatively, to control the power consumption by the wireless base station, the wireless base station adjusts a rate of communicating data transmitted from the wireless base station to one or more of the mobile communication devices. In one embodiment, the adjusted rate (such as decreasing a data bit rate of transmitting from the wireless base station) reduces a magnitude of the power consumption by the wireless base station. Increasing the rate of communicating data bits at an increased power level increases a magnitude of the power consumption by the wireless base station.

Still further example embodiments herein include, via the communication management hardware associated with the wireless base station, in response to receiving an adjustment to the power consumption information, replacing (substituting) a single wireless beam supporting communications with a first mobile communication device and a second mobile communication device with individual beams such as a first wireless beam supporting communications from the wireless base station to the first mobile communication device and a second wireless beam supporting communications from the wireless base station to the second mobile communication device.

As previously discussed, further embodiments herein include, via the communication management hardware associated with the wireless base station, maintaining a magnitude of the power consumption by the wireless base station. Fem in response to receiving an adjustment to the power consumption information, the wireless base station replaces (substitutes) a single broad wireless beam supporting communications with a first mobile communication device and a second mobile communication device with a first wireless beam supporting communications from the wireless base station to the first mobile communication device and a second wireless beam supporting communications from the wireless base station to the second mobile communication device.

The following description includes multiple operations associated with the communications and providing connectivity as described herein.

In processing operation #1, the wireless base station (such as CBSD) powers up and connects with a respective allocation management resource (such as Spectrum Access System or SAS).

In processing operation #2, the allocation management resource grants spectrum (such as one or more wireless channels) to the wireless base station. The wireless base station starts operation by creating beams (such as via beamforming) for each connected instance of user equipment (such as mobile communication device) in the network.

In processing operation #3, the wireless base station checks the supplied power or maximum power that can be supplied to itself through a power plant by requesting power consumption information indicating how much power the wireless base station is able to consume.

In processing operation #4, a power consumption manager such as a CMTS (Cable Modem Termination System) server or other suitable entity replies back to the request from the wireless base station. The reply from the power consumption manager includes a power consumption information indicating the total amount of available power available to the wireless base station.

In processing operation #5, the wireless base station implements establishing individual wireless beams for each mobile communication device (UE) in the network. The wireless base station calculates the amount of power consumed by the baseband unit for each additional beam as they are newly supported by the wireless base station.

In processing operation #6, based on the wireless base station providing an increased number of wireless services to UEs in the network, the wireless base station's power consumption in the baseband processing unit reaches a power limit.

In processing operation #7, if the number of UEs still increases after the power limit is reached, then the wireless base station performs one or more of the following:

7a. the wireless base station notifies each mobile communication device to report its location;

7b. the wireless base station checks the proximity of UEs based on reported location information (such as latitude and longitude information) indicating a location of each wireless station;

7c. the wireless base station turns off individual beams and creates one wide wireless beam for all UEs which are geographically close to each other;

7d. the wireless base station checks its power consumption with respect to the power limit (power consumption information) again. If the power consumption is below a threshold, the wireless base station repeat steps 7a-d; if not, the wireless base station will continue checking the amount of data transmitted with each beam;

i.) If the amount of data communicated to the mobile communication devices is greater that a threshold, then wireless base station reduces the data rate transmission of that beam for N seconds or longer to check to see if it improves power consumption, ii.) If a certain beam is created for high QoS data, the wireless base station terminates that beam or converts that beam to normal QoS data type, iii.) If one UE frequently makes network transitions (too many IDLE to CONNECTED and CONNECTED to IDLE network transition), then wireless base station rejects individual beam creation for that mobile communication device, and that mobile communication device connects with the single big beam that is already created and transmitted by the CBSD.

In processing operation #8, if the power consumption information by the wireless base station is increased, the wireless base station will provide better service to such devices via termination of the wireless beam shared amongst multiple mobile communication devices and creation of a new beam for each instance of user equipment.

Embodiments herein are useful over conventional techniques because they provide a unique way of providing efficient use of wireless services while maintaining a respective wireless base station within an allocated power consumption budget.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to: receive power consumption information; determine an amount of a power consumption by a wireless base station communicating with multiple mobile communication devices; and adjust wireless communications from the wireless base station to maintain the power consumption of the wireless base station with respect to the power consumption information.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
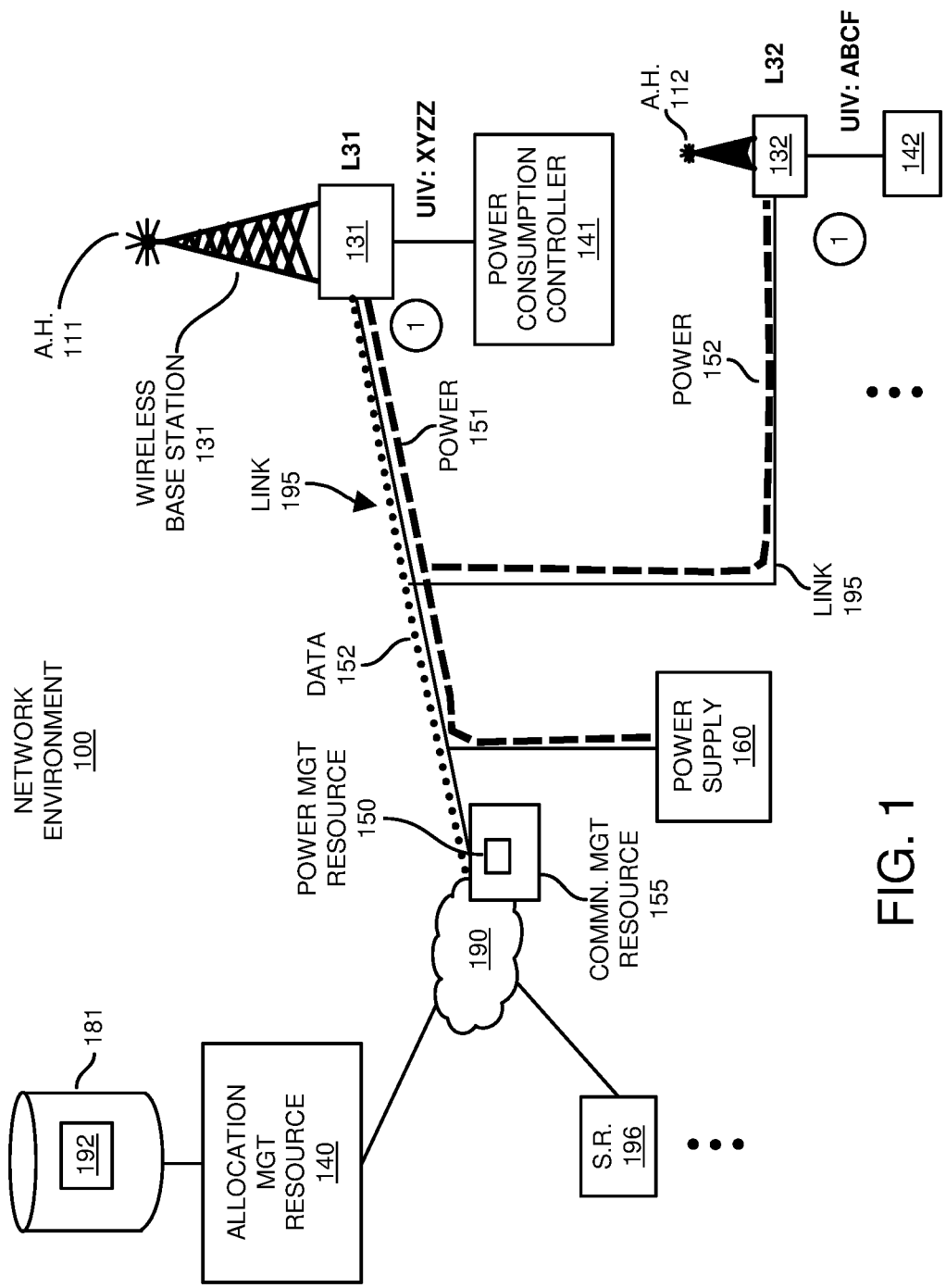
FIG. 1 is an example diagram illustrating a communication network environment and multiple wireless base stations implementing power consumption control according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As further discussed herein, a communication system includes a first wireless base station supporting communications with multiple mobile communication devices. The first wireless base station is limited to an amount of power it is able to consume. For example, the wireless base station receives allocation of a power consumption information from a power consumption manager. To control power consumption with respect to the received power consumption information, the wireless base station determines (such as based on an estimation, calculation, measurement, etc.), an amount of a power consumption by the wireless base station while communicating with multiple mobile communication devices. The wireless base station adjusts wireless communications transmitted from the wireless base station to maintain the power consumption of the wireless base station with respect to the received power consumption information. Adjustment of the power consumption includes one or more operations such as increasing or decreasing a magnitude of the power consumption by the wireless base station to maintain a magnitude of the power consumption within a desired limit.

Now, more specifically, with reference to the drawings, FIG. 1 is an example diagram illustrating a communication network environment and a wireless base station implementing power consumption control according to embodiments herein.

As shown, network environment 100 includes allocation management resource 140 (such as spectrum access system), power management resource 150, power supply 160, wireless base station 131 and corresponding power consumption controller 141, wireless base station 132 and corresponding power consumption controller 142, etc. Wireless network environment 100 includes any number of wireless base stations and corresponding power consumption controllers. Wireless network environment 100 further includes network 190, server resource 196, etc.

Wireless base station 131 includes antenna hardware 111 to communicate with one or more instances of user equipment in the network environment 100; wireless base station 132 includes antenna hardware 112 to communicate with one or more instances of user equipment in the network environment 100; and so on Note that each of the resources in network environment 100 can be configured to include or be configured as appropriate hardware, software, or combination of hardware and software to carry out respective operations as discussed herein.

More specifically, the wireless base station 131 as described herein can be implemented via respective wireless base station hardware, wireless base station software, or a combination of wireless base station hardware and wireless base station software; the power consumption controller 141 can be implemented via power consumption controller hardware, power consumption controller software, or a combination of power consumption controller hardware and power consumption controller software; the wireless base station 132 as described herein can be implemented via respective wireless base station hardware, wireless base station software, or a combination of wireless base station hardware and wireless base station software; the power consumption controller 142 can be implemented via power consumption controller hardware, power consumption controller software, or a combination of power consumption controller hardware and power consumption controller software; communication management resource 155 as described herein can be implemented via power management hardware, communication management software, or a combination of communication management hardware and communication management software; power management resource 150 as described herein can be implemented via power management hardware, power management software, or a combination of power management hardware and power management software; allocation management resource 140 as described herein can be implemented via allocation management hardware, allocation management software, or a combination of allocation management hardware and allocation management software; and so on.

As further shown in this example embodiment, the link 195 (such as shared communication link, cable, physical link, etc.) provides connectivity between the wireless network 190 and multiple base stations 131, 132, etc. In one embodiment, the communication management resource 155 (such as a cable modem termination system or other suitable entity) manages conveyance of communications (such as data 152) between the wireless base stations and the network 190.

In further example embodiments, the communication management resource 155 controls power consumption by each of the one or more wireless base stations. For example, the communication management resource 155 includes power management resource 150. As its name suggests, the power management resource 150 manages power consumption by one or more wireless base stations such that the total power consumption by multiple base stations does not exceed available power supplied by power supply 160 to the wireless base stations.

As previously discussed, the network environment includes power supply 160 (such as a power source) that: i) supplies respective power 151 to wireless base station 131, ii) supplies power 152 to wireless base station 132, etc.

In one embodiment, the power supply 160 is limited as to how much power it is able to supply over the link 195 to the respective one or more wireless base stations 131, 132, etc. The limitations may be based on a limited capability of the link 195 to convey power, inability of the communication management resource 155 or power supply 160 to supply power, etc.

In processing operation #1, assume that the wireless base station 131 is initially powered via power 151 provided by the power supply 160 over the link 160. As previously discussed, the power supply 150 may reside at any location along the link 195 such as at the communication management resource 155, somewhere along the link 195 between the network 190 and the wireless base station 131, etc.

Prior to providing any wireless stations connectivity through the wireless base station 131 to the network 190, the wireless base station 131 must learn of an amount of power available for its use as further discussed below.

Figure 2:
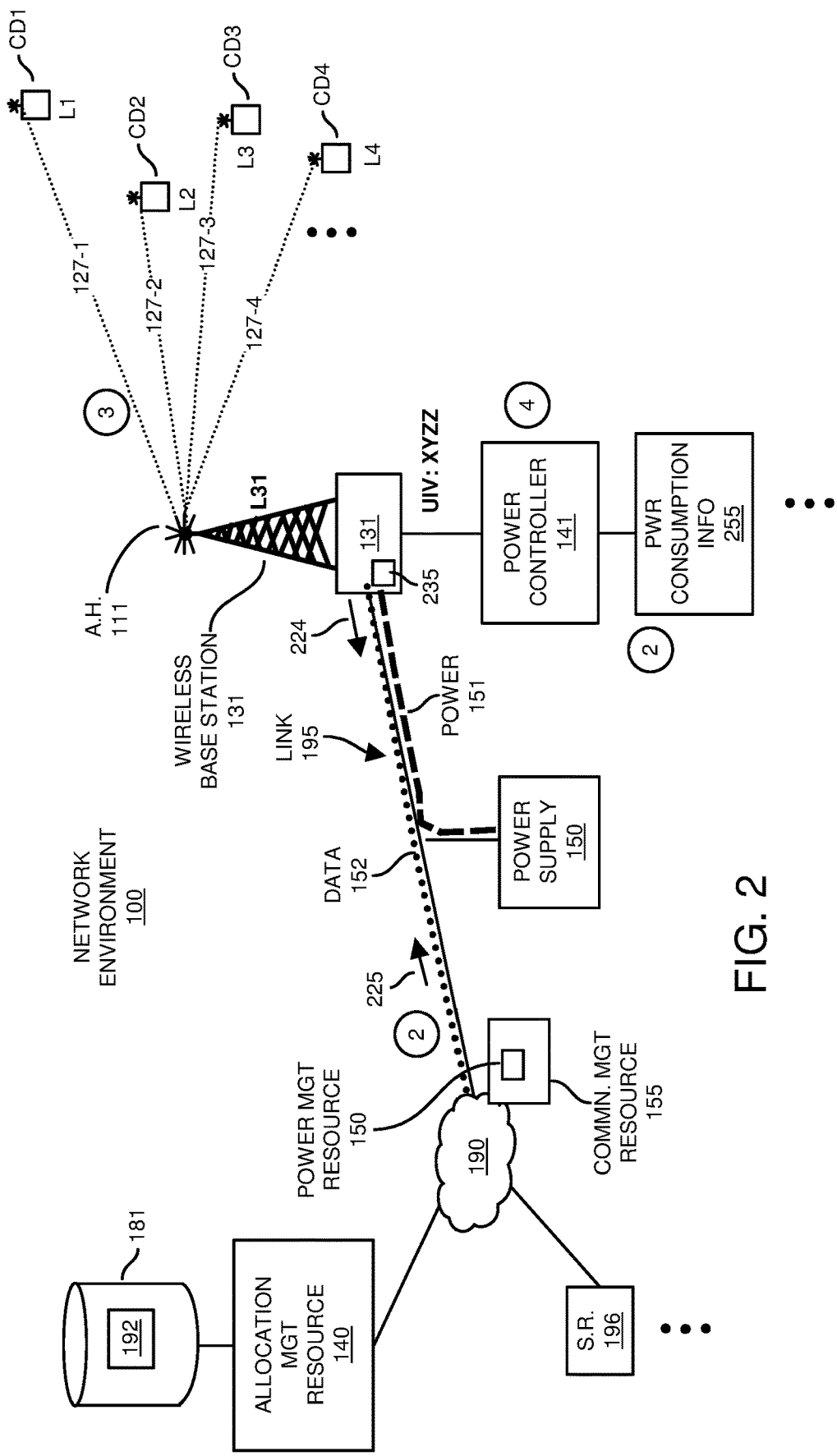
FIG. 2 is an example diagram illustrating communications supporting power consumption control according to embodiments herein.

FIG. 2 is an example diagram illustrating communications supporting power consumption control according to embodiments herein.

As previously discussed, the wireless base station 131 is limited as to an amount of power it is able to consume. In one embodiment, in processing operation #2, the wireless base station 131 generates communications 224 and conveys them over the link 195 to the power management resource 150 associated with communication management resource 155. Via the communications 224, the wireless base station 131 requests power consumption limit information indicating an amount of power it is able to consume.

In response to receiving (request or other type of) communications 224, the power management resource 150 generates and communicates (via communications 225) power consumption information 255 and forwards it over the link 195 to the wireless base station 131.

The power consumption information 255 indicates an amount of power that can be consumed by the wireless base station 131.

The power consumption information 255 can include any suitable information. For example, in one embodiment, the power consumption information 255 includes an absolute maximum power limit that the wireless base station 131 is able to consume. Additionally, or alternatively, the power consumption information 255 includes time duration information indicating a duration in which the wireless base station 131 is allowed to consume greater than a power threshold limit. For example, the power consumption information 255 can be configured to indicate that the average maximum power consumed by the wireless base station is limited to 100 watts. However, the power consumption information 255 may provide a short-term duration such as 10 seconds (or other suitable duration) in which the wireless base station 131 is able to temporarily consume power up to a second power consumption limit of 120 watts or other suitable value.

Note that each of the wireless base stations in the network environment 100 may be allocated different amounts of power by the power management resource 150. For example, the wireless base station 131 may be allocated use of 100 watts of power to provide/support wireless communication links to corresponding communication devices; wireless base station 132 may be allocated use of 130 watts of power to provide wireless communication links to corresponding communication devices; and so on. The communication management resource 155 can be configured to support load balancing in which the power allocated to each of the wireless base stations 131, 132, etc., depends on an amount of mobile communication devices supported by the wireless base stations. More specifically, if wireless base station 131 supports more mobile communication devices than the wireless base station 132, then the wireless base station 131 is allocated more power than wireless base station 132. Conversely, if wireless base station 132 supports more mobile communication devices than the wireless base station 131, then the wireless base station 132 is allocated more power than wireless base station 131.

As further discussed herein, the allocation of power for consumption by each of the wireless base stations may change over time. For example, the power management resource 150 can be configured to limit the wireless base station 131 to use of a first amount of power for a first duration of time. The power management resource can be configured to limit the wireless base is to use of a second amount of power (such as more or less than the first amount of power) for a second duration of time.

Subsequent to receiving the power consumption information 255, in processing operation #3, the wireless base station 131 establishes respective wireless connectivity to each of the communication devices in its vicinity. For example, the wireless base station 131 establishes wireless connectivity 127-1 with the communication device CD1 at location L1; the wireless base station 131 establishes wireless connectivity 127-2 with the communication device CD2 at location L2; the wireless base station 131 establishes wireless connectivity 127-3 with the communication device CD3 at location L3; the wireless base station 131 establishes wireless connectivity 127-4 with the communication device CD4 at location L4; and so on. In one embodiment, wireless connectivity depends on the respective mobile communication devices requesting to establish a corresponding wireless communication link.

In still further example embodiments, instead of being mobile, any of the communication devices CD1, CD2, CD3, CD4, etc., are potentially disposed at a respective fixed location with respect to the wireless base station 131. Additionally, or alternatively, as previously discussed, the communication devices 151, 152, 153, etc., are mobile communication devices operated by roaming respective users/operators.

Note further that, when establishing wireless communication links and supporting wireless connectivity, via power consumption controller 141, the wireless base station 131 monitors its power consumption. This can be achieved in any suitable manner. For example, the power supply 150 can be configured to supply a respective power 151 as a voltage. In one embodiment, the power consumption controller 141 monitors amount of current consumed by the wireless base station 131.

In further example embodiments, the power consumed by the wireless base station 131 is equal to the magnitude of the current consumed by the wireless base station 131 multiplied by the corresponding received voltage from the power supply 150.

In yet further example embodiments, in processing operation #4, to control power consumption with respect to the received power consumption information 255, the wireless base station 131 determines (such as based on an estimation, calculation, measurement, etc.), an amount of a power consumption by the wireless base station while communicating with multiple mobile communication devices. The wireless base station adjusts one or more parameters associated with wireless communications transmitted from the wireless base station to maintain the power consumption of the wireless base station 131 under limits as specified by the received power consumption information 255. Adjustment of the power consumption by the wireless base station 131 can include, via the power consumption controller 141 or other suitable entity, increasing or decreasing a magnitude of the power consumption by the wireless base station 131.

The power consumption associated with each wireless base station 131 can be adjusted in any suitable manner. As discussed in detail below, embodiments herein include, via the wireless base station 131, implementing first wireless beamforming settings to communicate with the multiple mobile communication devices CD1, CD2, CD3, etc. Adjustment of the wireless communications associated with wireless base station 131 includes adjustment of the wireless beamforming settings used to communicate with the communication devices CD1, CD2, CD3, etc. Beamforming adjustments may result in increased power consumption or decreased power consumption by the wireless base station 131.

Note further that the allocation management resource 140 can be configured to allocate one or more wireless channels for use by the wireless base stations and corresponding mobile communication devices. For example, in one embodiment, the allocation management resource 140 allocates channel from the CBRS (Citizens Band Radio Service) band or other suitable spectrum. As shown in FIG. 1, allocation management resource 140 tracks allocation of wireless channels via allocation information 192 stored in repository 181.

Figure 3:
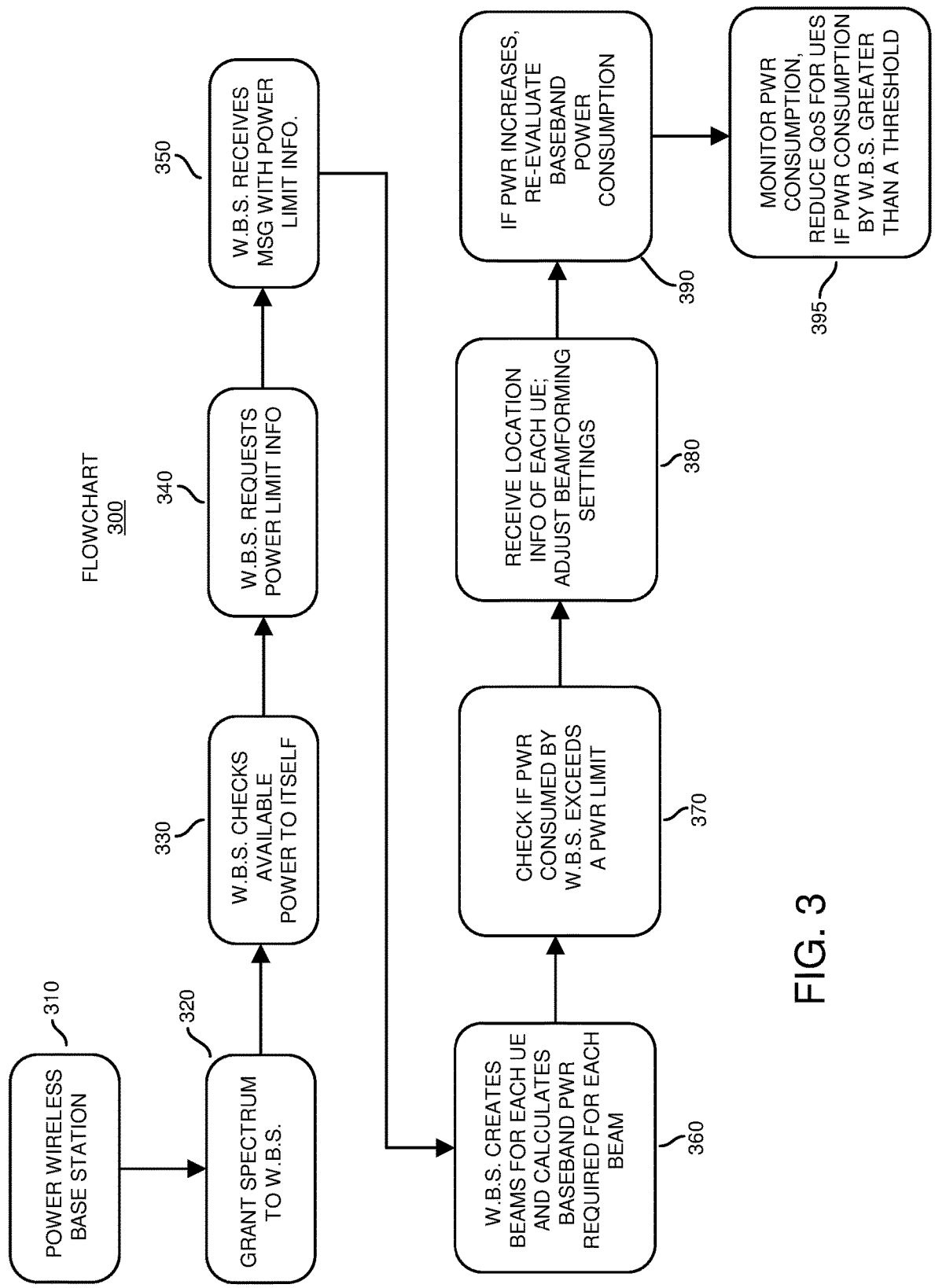
FIG. 3 is an example diagram illustrating base station power consumption according to embodiments herein.

FIG. 3 is an example diagram illustrating base station power consumption according to embodiments herein.

In processing operation 310, the wireless base station 131 is powered via the power 151 received over the communication link 195.

In processing operation 320, the wireless base station 131 communicates over the communication link 195 with the allocation management resource 140 (such as spectrum access system). The allocation management resource 140 allocates use of one or more wireless channels to the wireless base station 131 to provide the communication devices CD1, CD2, CD3, etc., wireless connectivity to the network 190 (such as the Internet cellular phone network, etc.).

In accordance with further example embodiments, the one or more wireless channels (wireless bandwidth) allocated to the wireless base station 131 are allocated from a tiered wireless communication hierarchy in which an incumbent user (such as the government) is ranked higher in priority than the wireless base station 131. For example, in one non-limiting example embodiment, the communication management resource 140 allocates bandwidth to the wireless base station 131 from a so-called CBRS (Citizens Band Radio System) band operating between 3.550 and 3.700 GHz (GigaHertz) (such as 150 MegaHertz or 15 wireless channels that are each 10 MHz wide).

In processing operation 330, the wireless base station 131 checks power available to itself as indicated by the power consumption information 255. In processing operation 340, this includes communicating a respective request to the power management resource 150 associated with the communication management resource 155. In one embodiment, the wireless base station 131 communicates its unique identity (such as unique identifier value XYZZ) to the power management resource 150. In response to receiving, the communication, the power management resource 150 maps the identity to respective power consumption information assigned to the wireless base station 131. Additionally, or alternatively, as previously discussed, the power consumption controller 141 allocates an amount of power to each of the wireless base stations depending on a number of mobile devices supported by the wireless base stations.

In processing operation 350, the wireless base station 131 receives a respective message (such as communication 225) from the power management resource 150 over the communication link 195. The message includes power consumption information 255 assigned to the wireless base station 131. The power consumption controller 141 of the wireless base station 131 controls operation of the wireless base station 131 based on the power consumption information 255.

In processing operation 360, the wireless base station 131 creates a wireless beam for each instance of user equipment (CD1, CD2, CD3, etc.) and calculates base-band power required for each beam. In one embodiment, total power consumed by the wireless base station 131 includes a combination of beam power associated with each of the communication links 127-1, 127-2, etc., and total base-band power to process communications conveyed over the respective communication links.

In processing operation 370, the power consumption controller 141 compares the total power consumed by the wireless base station 131 to power consumption limits as indicated by the power consumption information 255. The wireless base station 131 determines if the total consumed power is greater than a respective threshold level (power limit) as specified by the power consumption information 255.

In processing operation 380, the wireless base station 131 receives location information associated with each of the mobile communication devices CD1, CD2, CD3, etc. In one embodiment, the wireless base station 131 adjusts beamforming settings of the communication links 127 to maintain a magnitude of the power consumption associated with the wireless base station below the respective threshold level as specified by the power consumption information 255.

In processing operation 390, if the implemented adjustment of the beamforming settings increases power consumption by the wireless base station 131, the power consumption controller 141 re-evaluates base-band and/or communication link 127 power consumption.

In processing operation 395, the power consumption controller 141 monitors power consumption by the wireless base station 131. The power consumption controller 141 reduces a respective quality of service associated with one or more communication links 127 if the detected power consumption by the wireless base station 131 is greater than the power consumption limit as specified by the power consumption information 255.

Figure 4:
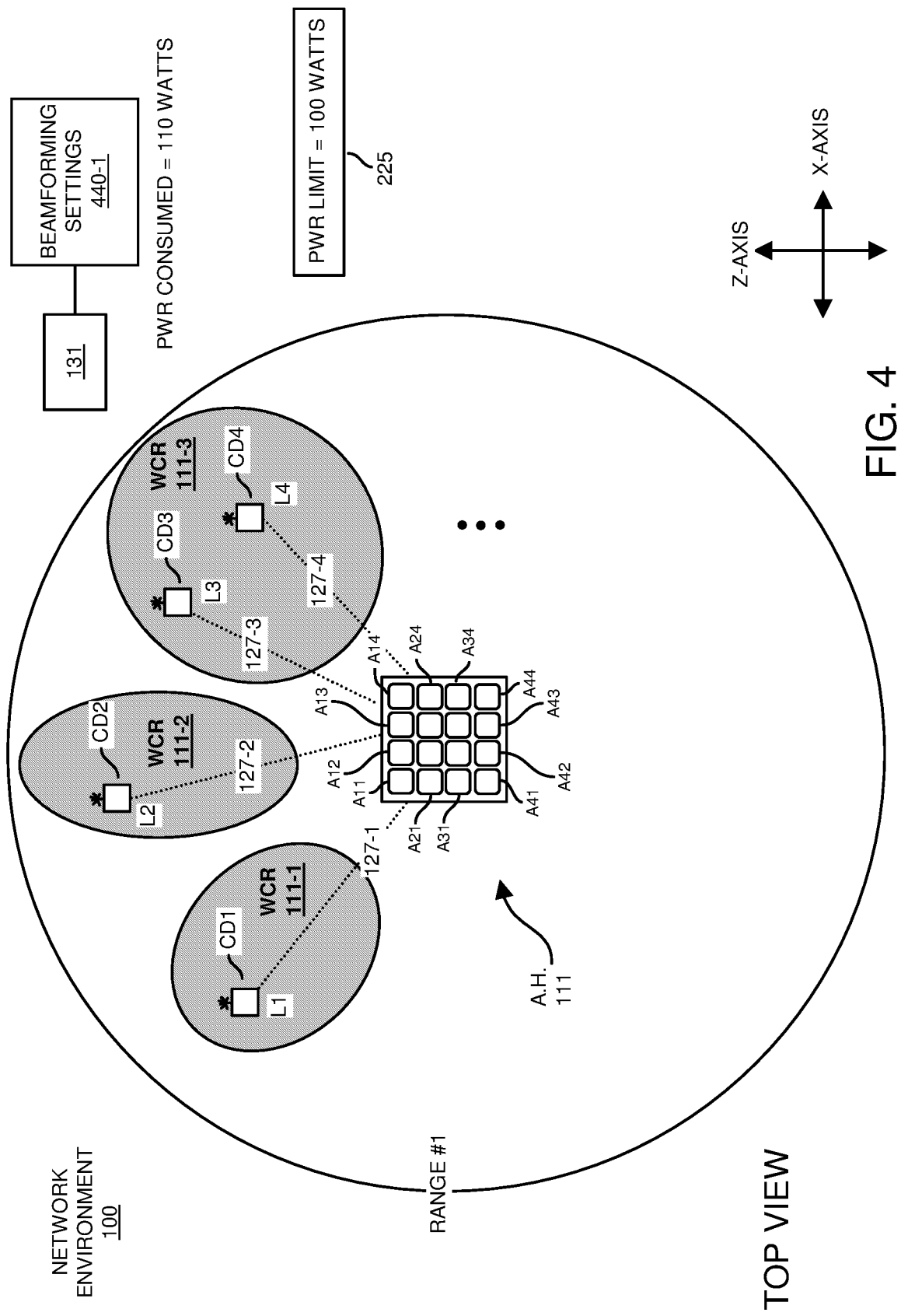
FIG. 4 is an example diagram illustrating implementation of beamforming to communicate with multiple communication devices according to embodiments herein.

FIG. 4 is an example diagram illustrating implementation of beamforming to communicate with multiple communication devices according to embodiments herein.

In this example embodiment, the antenna hardware 111 associated with the wireless base station 131 includes one or more antenna elements such as antenna element A11, antenna element A12, antenna element A13, etc.

In one embodiment, the wireless base station 131 supports multiple wireless beams. The wireless base station 131 implements use of one or more antenna elements of the antenna hardware 111 to produce each of the wireless beams.

Assume in this example embodiment that the power consumption controller 141 implements corresponding beamforming settings 440-1 associated with the wireless base station 131 to provide wireless connectivity as shown in FIG. 4. Beamforming settings 440-1 define and/or include, for each beam, one or more parameter settings such as angular range of the wireless coverage region the respective wireless beam, power level of the wireless beam, antenna elements to be used to create a respective wireless beam, etc.

In this example embodiment, the initial beamforming settings 440-1 define antenna settings of antenna hardware 111 and wireless base station 131 to provide: i) wireless coverage region 411-1 (wireless beam) supporting communication link 127-1 with communication device CD1, ii) wireless coverage region 411-2 (wireless beam) supporting communication link 127-2 with communication device CD2, iii) wireless coverage region 411-3 (wireless beam) supporting communication link 127-3 with communication device CD3 and communication link 127-4 with communication device CD4.

As further shown in this example embodiment, the power consumption controller 141 detects/determines that the total power consumption of wireless base station 131 is 110 watts. As previously discussed, this can include actual measurement of consumed power, calculation of consumed power, or a combination of both.

The power current power consumption of 110 watts by the wireless base station 131 of 110 watts exceeds the power limit threshold level of 100 watts. The power consumption controller 141 (power manager) compares the determined level of power consumption of 110 watts to the power threshold level of 100 watts as specified by the power consumption information 255. In this instance, the wireless base station 131 consumes more power than the 100 watts allocated by the power management resource 150. The power consumption controller 141 (communication management hardware) associated with the wireless base station 131 implements appropriate measures to stay within the power limit of 100 watts.

One measure implemented by the wireless base station to reduce power consumption is to reduce the number of individual beams used to support wireless communications with the mobile communication devices. For example, although the individual beams (wireless coverage region 411-1, wireless coverage region 411-2, wireless coverage region 411-3, etc.) provide a high quality of service (such as high bit rate) to each of the respective communication devices, embodiments herein include adjusting beamforming settings 440-1 to reduce a total power consumption by the wireless base station 131.

Figure 5:
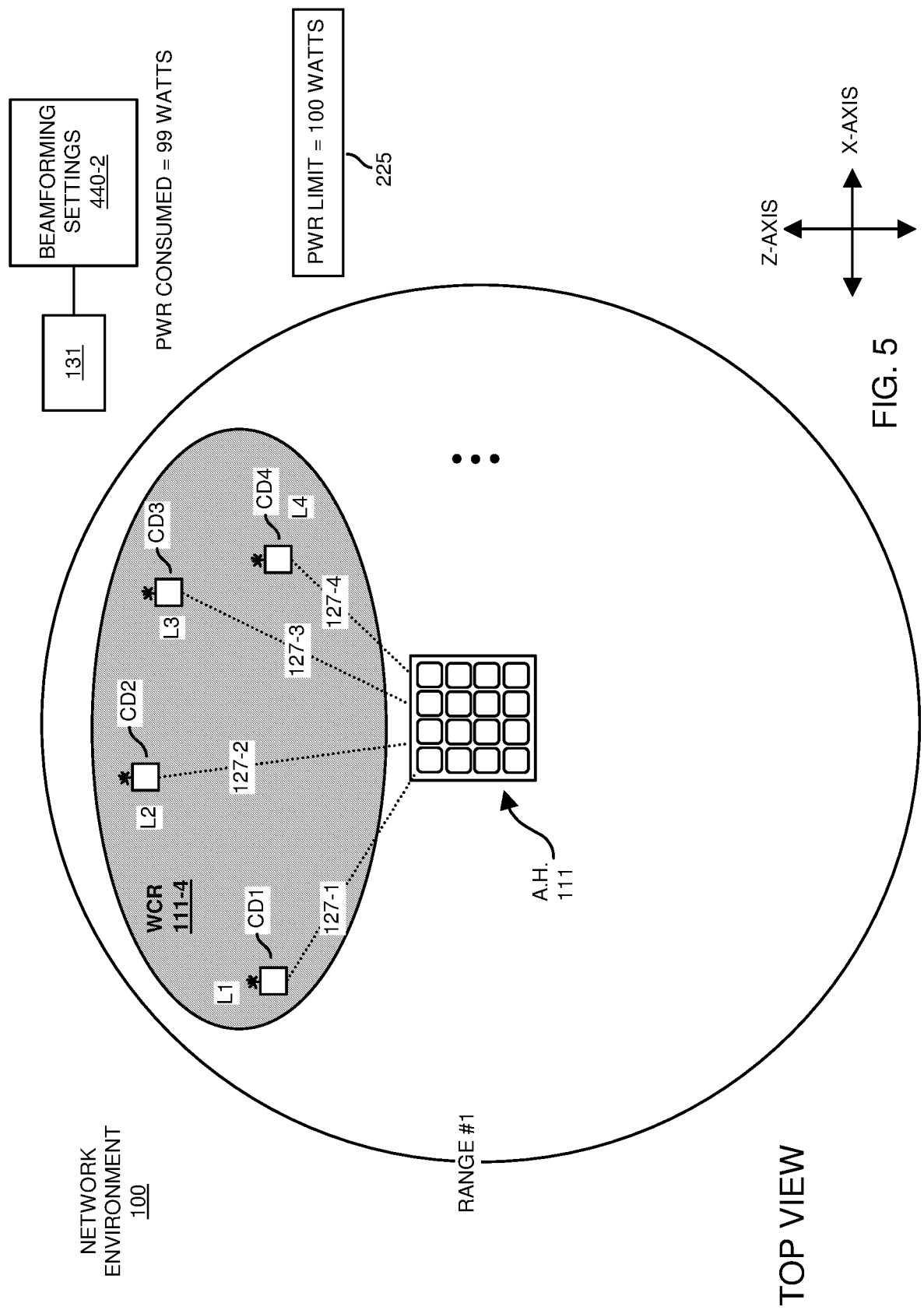
FIG. 5 is an example diagram illustrating monitoring of power consumption and adjustment of beamforming settings to support communications with multiple communication devices according to embodiments herein.

In one embodiment, adjusting the wireless communications (wireless beamforming settings 440-1) from the wireless base station 131 includes replacing the first wireless beam such as supporting wireless coverage region 411-1, the second wireless beam such as supporting wireless coverage region 411-2, and third wireless beam such as supporting wireless coverage region 411-3 with a single broad wireless beam as shown in FIG. 5.

Note that, in one embodiment, the power consumption controller 141 of the wireless base station 131 controls power consumption based on location information associated with one or more mobile communication devices (wireless stations) in the wireless network environment 100. For example, in one nonlimiting example embodiment, the wireless base station 131 receives location information indicating respective locations of the mobile communication devices. The location information can be received from any suitable resource such as the mobile communication devices themselves or other one or more entities in the network environment 100.

In this example embodiment, the power consumption controller 141 receives location information L1 (such as from the communication device CD1 or other suitable entity) indicating a location of the communication device CD1; power consumption controller 141 receives location information L2 (such as from the communication device CD2 or other suitable entity) indicating a location of the communication device CD2; the power consumption controller 141 receives location information L3 (such as from the communication device CD3 or other suitable entity) indicating a location of the communication device CD3; power consumption controller 144 receives location information L4 (such as from the communication device CD4 or other suitable entity) indicating a location of the communication device CD4; and so on.

After receiving the location information, in furtherance of reducing power consumption by the wireless base station 131, the power consumption controller 141 determines which beams to consolidate into a single beam based on a respective location of the communication devices. For example, in this example embodiment, the power consumption controller 141 determines, based on received location information associated with the communication devices CD11, CD12, etc., that they reside near (such as within a threshold distance of) each other and the grouping of communication devices can be provided wireless connectivity via a single broad wireless beam as shown in FIG. 5. The single wide beam in FIG. 5 reduces power consumption by the wireless base station 131, while still providing wireless support to the communication devices.

FIG. 5 is an example diagram illustrating monitoring of power consumption and adjustment of beamforming settings to support communications with multiple communication devices according to embodiments herein.

As shown, the wireless base station 131 produces beamforming settings 440-2 as a substitute with respect to beamforming settings 440-1.

In this example embodiment, the beamforming settings 440-2 define a single wireless beam (such as wireless coverage region 111-4) supporting connectivity to communication devices CD1, CD2, CD3, etc. Beamforming settings 440-2 define and/or include, for each beam, one or more parameter settings such as angular range of the wireless coverage region associated with the respective wireless beam, power level of the wireless beam, etc.

Implementation of the beamforming settings 440-2 as a substitute to beamforming settings 440-1 reduces the power consumption by the wireless base station 131 below the threshold level of 100 watts. For example, in one embodiment, the implementation of the beamforming settings 440-2 results in a reduction of power consumption of the wireless base station to 99 watts. This is below the power consumption limit of 100 watts.

Referring again to FIG. 4, note that, additionally, or alternatively, to control the power consumption by the wireless base station 131, the wireless base station 131 can be configured to adjust a rate of communicating data transmitted from the wireless base station 131 via the to one or more of the mobile communication devices. In one embodiment, the adjusted rate (such as decreasing a data bit rate of transmitting from the wireless base station, reducing a wireless power level of transmitting data to the communication devices, etc.) reduces a magnitude of the power consumption by the wireless base station. Increasing the rate of communicating data bits (such as including transmitting wireless communications at a higher wireless power level) increases a magnitude of the power consumption by the wireless base station 131.

Accordingly, embodiments herein include adjusting one or more parameters associated with transmitting or receiving wireless communications with respect to the wireless base station.

Figure 6:
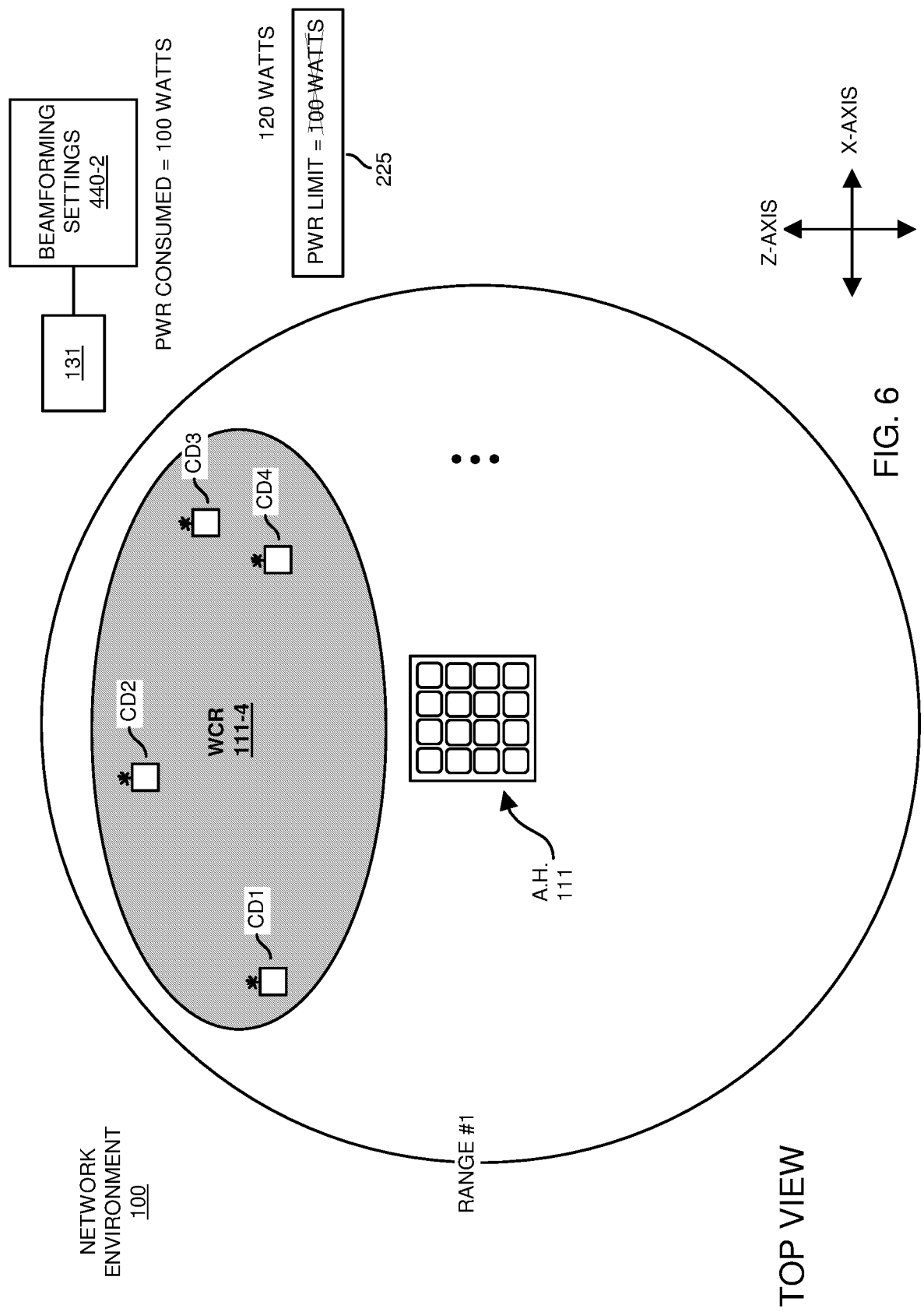
FIG. 6 is an example diagram illustrating adjustment of power consumption settings and monitoring of wireless base station power consumption according to embodiments herein.

FIG. 6 is an example diagram illustrating adjustment of power consumption settings and monitoring of wireless base station power consumption according to embodiments herein.

In this example embodiment, the wireless base station 131 receives a power adjustment to the power consumption information 255. For example, assume that the wireless base station 132 consumes 20 watts less power. In such an instance, the power management resource 150 allocates the additional 20 watts of power to the wireless base station 131. For example, instead of being assigned a power limit of 100 watts, the newly received power consumption information 155 from the power management resource 150 indicates that 120 watts has been assigned to the wireless base station 131.

Figure 7:
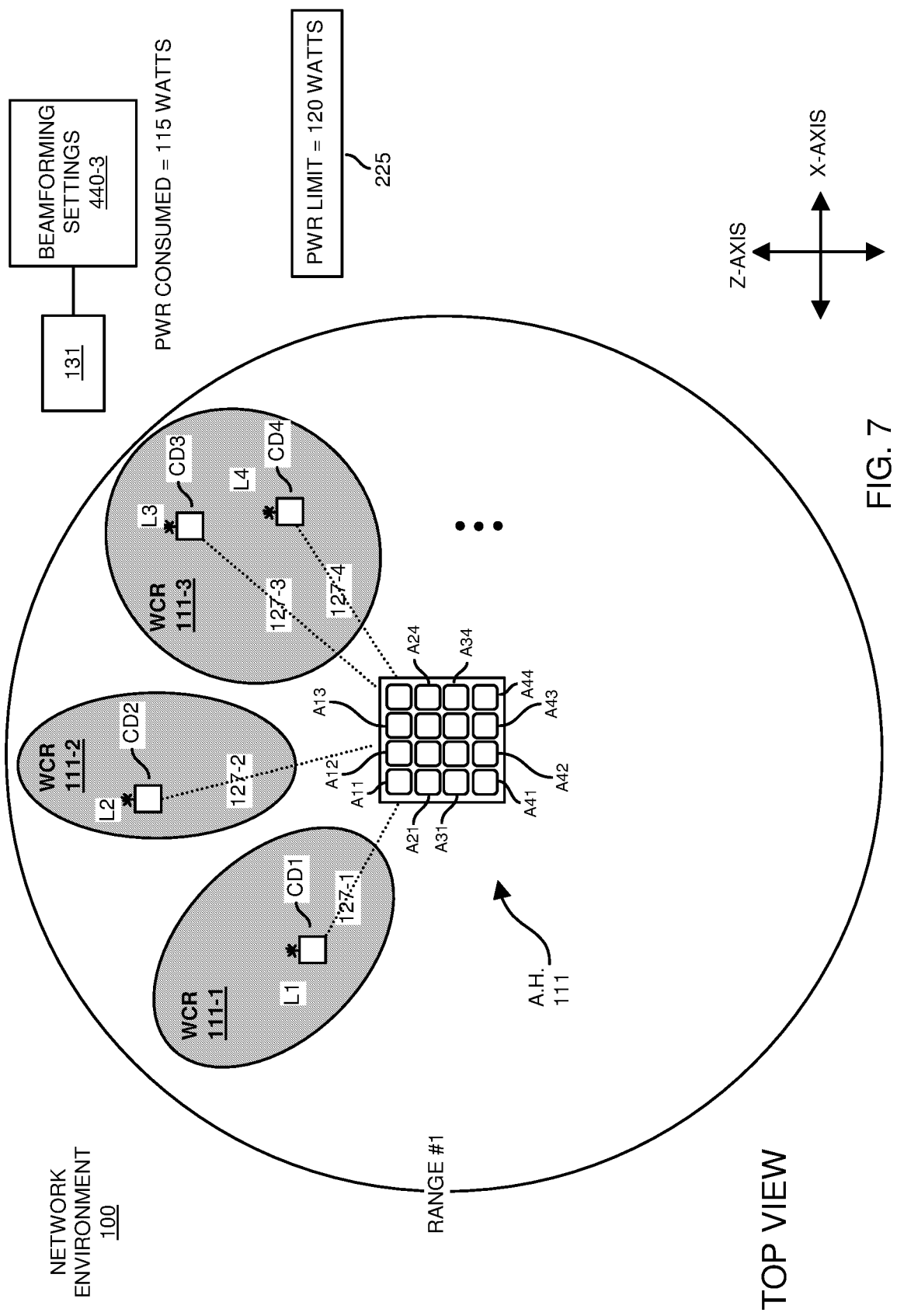
FIG. 7 is an example diagram illustrating modification of beamforming settings to control power consumption and communicate with multiple communication devices according to embodiments herein.

In response to receiving an adjustment to the power consumption information 255, the wireless base station 131 proceeds with adjusting the single broad beam (wireless coverage region 111-4) into multiple individual beams as shown in FIG. 7. Although the beamforming settings implemented in FIG. 7 result in increased power consumption by the wireless base station 131, the corresponding multiple individual beams provide a higher data rate and better wireless performance to each of the mobile communication devices. The total power consumption with additional individual wireless beams is still be the threshold level of 120 watts.

FIG. 7 is an example diagram illustrating modification of beamforming settings to communicate with multiple communication devices according to embodiments herein.

In response to receiving the increased power limit to 120 watts as specified by the power consumption information 255, the wireless base station 131 implements new 0beamforming settings 440-3 (as a substitute to beamforming settings 440-2). The beamforming settings 440-3 replace (substitute) a single wireless beam (such as supporting wireless coverage region 111-4 in FIG. 6) with multiple wireless beams including a first wireless beam supporting wireless coverage region 111-1, second wireless beam supporting wireless coverage region 111-2, third wireless beam supporting wireless coverage region 111-3, etc., as shown in FIG. 7.

Thus, embodiments herein include, via the communication management resource (such as power consumption controller 141) associated with the wireless base station 131, receiving power adjustment information with respect to the power consumption information 255. In response to receiving an adjustment to the power consumption information 255 such as an increased power limit from 100 watts to 120 watts, the wireless base station 131 replaces (substitutes) a single wireless beam (such as associated with the beamforming settings 440-2) supporting a single wide beam with individual wireless beams such as a first wireless beam supporting wireless coverage region 111-1, second wireless beam supporting wireless coverage region 111-2, third wireless beam supporting wireless coverage region 111-3, etc.

Figure 8:
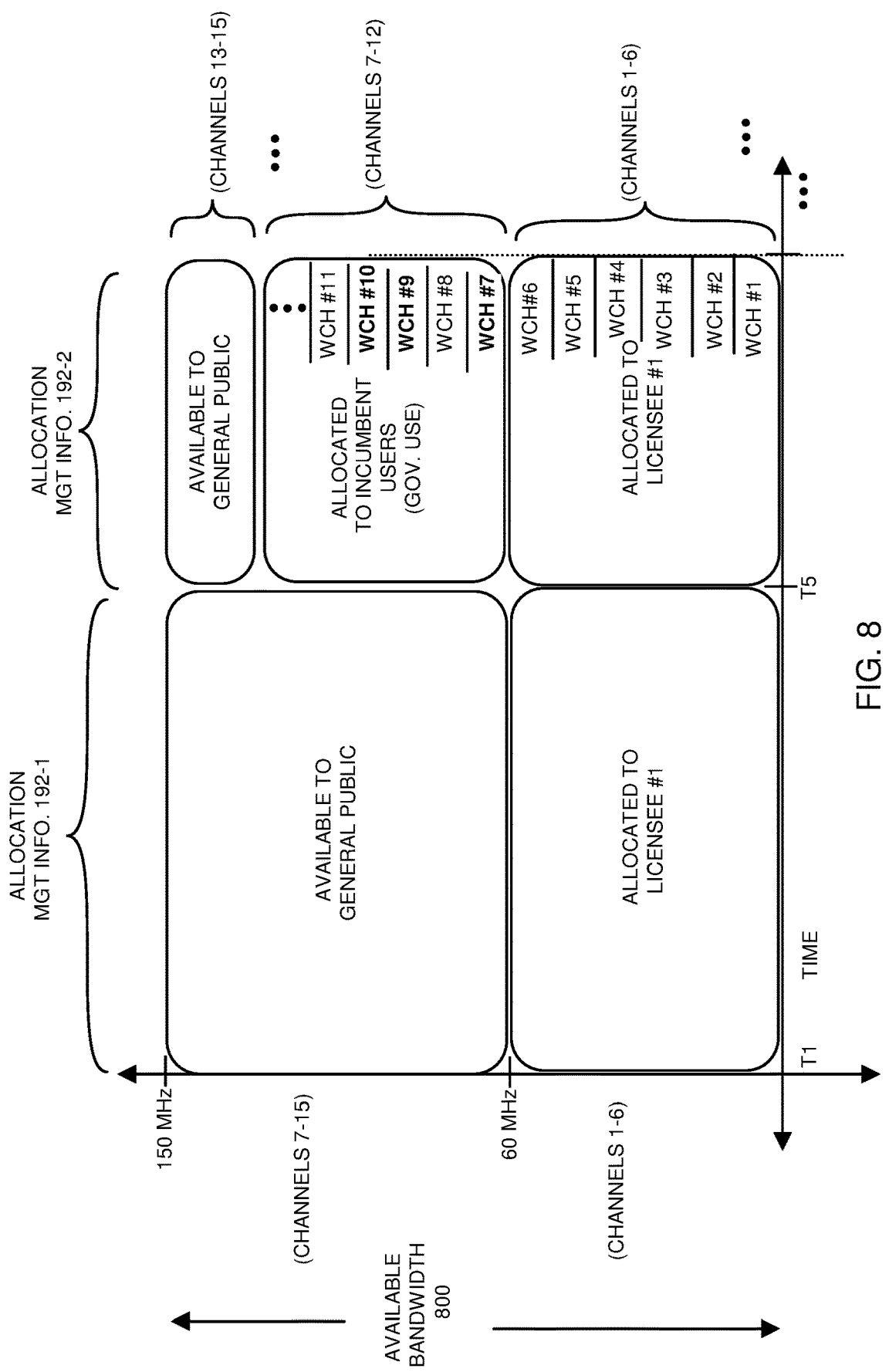
FIG. 8 is an example diagram illustrating a wireless spectrum from which wireless channels are allocated and deallocated according to embodiments herein.

FIG. 8 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, allocation management resource 140 (such as spectrum access system or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use as shown in the content access information 192-2 as shown in FIG. 12.

More specifically, in this example, the allocation management information 192-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 7-12) of the spectrum by an incumbent user such as the government. In such an instance, the allocation management resource 140 updates the channel allocation information such that the allocation management information 192-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users) such as wireless base station 131 or wireless base station 431 (whichever happens to be operating at the time).

In one embodiment, in response to revocation of the allocation of wireless channels 7-12, the communication management resource 140 notifies the wireless base station 131 at or around time T5 that the wireless base station 131 is no longer able to use wireless channel #7, #8, #9, and #10 because these channels have been revoked and assigned for use by the incumbent user.

Thus, between time T1 and time T5, the wireless base station 131 uses the wireless channels #7, #8, #9, #10, etc., to provide wireless service to the communication devices. At or around time T5, the communication management resource 140 deallocates use of the wireless channels #7, #8, #9 and #10 from the wireless base station 131 in favor of use of the wireless channels #7, #8, #9, and #10 being used by or allocated to the incumbent user after time T5.

This illustrates the dynamic availability of different wireless channels bandwidth in a hierarchy as shared in network environment 100. For example, if communication management resource 140 allocates use of wireless channels #7-12 in the hierarchy of available channels to any of one or more base stations, communication devices, etc., then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

Figure 9:
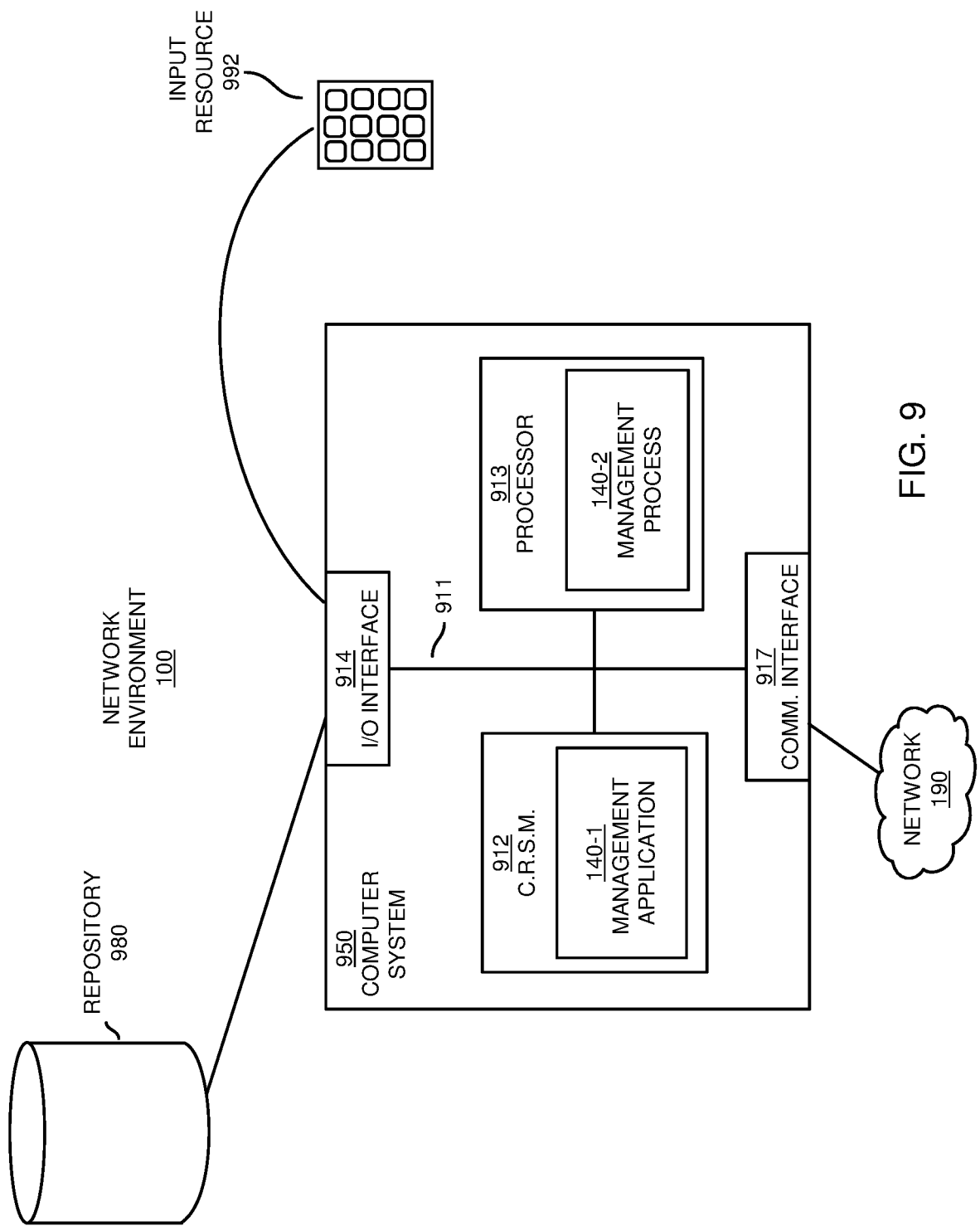
FIG. 9 is an example diagram illustrating example computer architecture operable to execute one or more operations according to embodiments herein.

FIG. 9 is an example block diagram of a computer system for implementing any of the operations as discussed herein according to embodiments herein.

Any of the resources (such as allocation management resource 140, wireless base station 131, wireless base station 132, power consumption controller 141, power consumption controller 142, communication management resource 155, power management resource 150, etc.) as discussed herein can be configured to include a respective instantiation of computer processor hardware and corresponding executable instructions to carry out the different operations as discussed herein. For example, communication management resource 140 can be configured to execute the management application 140-1 to execute operations associated with the communication management resource 140; multi-tier wireless base station 131 can be configured to execute the management application 140-1 to execute operations associated with the multi-tier wireless base station 131, etc.

As shown, computer system 950 of the present example includes an interconnect 911 that couples computer readable storage media 912 such as a non-transitory type of media (i.e., any type of hardware storage medium) from which digital information is stored and retrieved, a processor 913, I/O interface 914, and a communications interface 917.

I/O interface 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/ or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
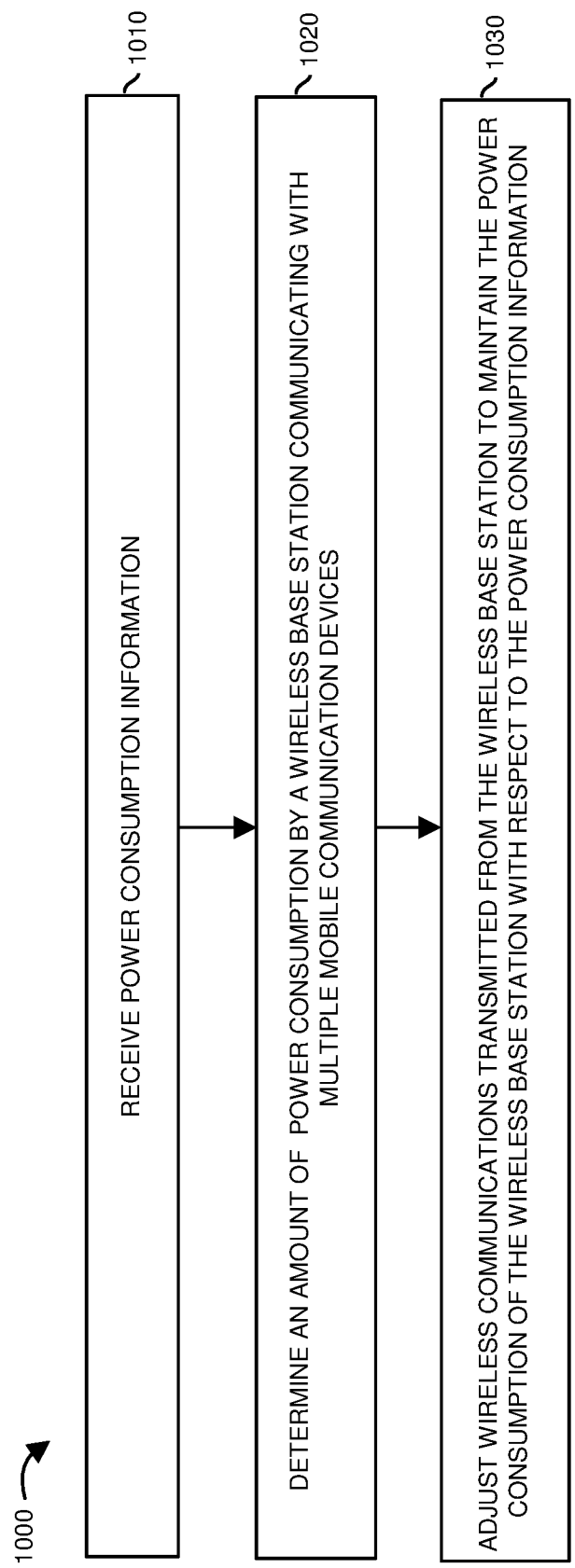
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the wireless base station 131 receives power consumption information 255 such as including a power consumption limit value.

In processing operation 1020, the power consumption controller 141 determines an amount of power consumption by the wireless base station 131 communicating with multiple mobile communication devices.

In processing operation 1030, the power consumption controller 141 adjusts wireless communications transmitted from the wireless base station 131 to maintain the power consumption of the wireless base station 131 with respect to the power consumption information 255.

Note again that techniques herein are well suited to support power management associated with communications in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   receiving power consumption information;
   determining an amount of power consumed by a wireless base station communicating with multiple mobile communication devices; and
   adjusting wireless communications transmitted from the wireless base station to maintain the power consumed by the wireless base station with respect to the power consumption information.

2. The method as in claim 1 further comprising:
   via the wireless base station, implementing wireless beamforming settings to communicate with the multiple mobile communication devices; and
   wherein adjusting the wireless communications includes adjusting the wireless beamforming settings.

3. The method as in claim 1, wherein adjusting the wireless communications reduces a magnitude of the power consumed by the wireless base station.

4. The method as in claim 1 further comprising:
   comparing the determined amount of power consumed to a power limit value as indicated by the power consumption information.

5. The method as in claim 1 further comprising:
   at the wireless base station:
   establishing a first wireless beam to communicate with a first mobile communication device of the multiple mobile communication devices;
   establishing a second wireless beam to communicate with a second mobile communication device of the multiple mobile communication devices; and
   wherein adjusting the wireless communications from the wireless base station includes replacing the first wireless beam and the second wireless beam with a third wireless beam conveying communications from the wireless base station to both the first mobile communication device and the second mobile communication device.

6. The method as in claim 1 further comprising:
   receiving location information indicating respective locations of the multiple mobile communication devices; and
   adjusting wireless communications transmitted from the wireless base station based on the location information.

7. The method as in claim 6, wherein adjusting the wireless communications transmitted from the wireless base station includes: adjusting wireless beamforming settings associated with the wireless base station.

8. The method as in claim 1, wherein adjusting the wireless communications transmitted from the wireless base station includes:
   adjusting a rate of communicating data wirelessly transmitted from the wireless base station.

9. The method as in claim 8, wherein the adjusted rate reduces a magnitude of the power consumed by the wireless base station.

10. The method as in claim 1 further comprising:
in response to receiving an adjustment to the power consumption information, replacing a single wireless beam supporting communications with a first mobile communication device and a second mobile communication device with a first wireless beam supporting communications from the wireless base station to the first mobile communication device and a second wireless beam supporting communications from the wireless base station to the second mobile communication device.

11. A system comprising:
communication management hardware operative to:
receive power consumption information;
determine an amount of power consumption by a wireless base station communicating with multiple mobile communication devices; and
adjust wireless communications from the wireless base station to maintain the power consumption of the wireless base station with respect to the power consumption information.

12. The system as in claim 11, wherein the communication management hardware is further operative to:
via the wireless base station, implement wireless beamforming settings to communicate with the multiple mobile communication devices; and
adjust the wireless beamforming settings.

13. The system as in claim 11, wherein adjustment of the wireless communications reduces the power consumption by the wireless base station.

14. The system as in claim 11, wherein the communication management hardware is further operative to:
compare the determined amount of power consumption by the wireless base station to the power consumption information.

15. The system as in claim 11, wherein the wireless base station is operative to:
establish a first wireless beam to communicate with a first mobile communication device of the multiple mobile communication devices;
establish a second wireless beam to communicate with a second mobile communication device of the multiple mobile communication devices; and
substitute the first wireless beam and the second wireless beam with a third wireless beam to convey communications from the wireless base station to the first mobile communication device and the second mobile communication device.

16. The system as in claim 11, wherein the communication management hardware is further operative to:
receive location information indicating respective locations of the multiple mobile communication devices; and
adjust wireless communications transmitted from the wireless base station based on the location information.

17. The system as in claim 16, wherein the communication management hardware is further operative to:
adjust the wireless beamforming settings.

18. The system as in claim 11, wherein the communication management hardware is further operative to:
adjust a rate of communicating data transmitted from the wireless base station.

19. The system as in claim 18, wherein the adjusted rate reduces a magnitude of the power consumption by the wireless base station.

20. The system as in claim 11, wherein the communication management hardware is further operative to:
in response to receiving an adjustment to the power consumption information, substitute a single wireless beam supporting communications with a first mobile communication device and a second mobile communication device with a first wireless beam supporting communications from the wireless base station to the first mobile communication device and a second wireless beam supporting communications from the wireless base station to the second mobile communication device.

21. Computer-readable storage hardware having instructions stored thereon, the instructions, when carried out by computer processor hardware, cause the computer processor hardware to:
receive power consumption information;
determine an amount of power consumption by a wireless base station communicating with multiple mobile communication devices; and
adjust wireless communications from the wireless base station to maintain the power consumption of the wireless base station with respect to the power consumption information.

22. The method as in claim 1, wherein the power consumed by the wireless base station is received from a power supply conveying the power over a link to the wireless base station.

23. The method as in claim 22, wherein the wireless base station is a first wireless base station; and
wherein the power supply is operable to supply power to multiple wireless base stations including the first wireless base station and a second wireless base station.

24. The method as in claim 23 further comprising:
receiving the power consumption information from a power consumption controller, the power consumption controller operable to generate the power consumption information based on a limited capability of the power supply to deliver power to the multiple wireless base stations including the first wireless base station second wireless base station.

25. The method as in claim 1, wherein a magnitude of a power limit value as specified by the power consumption information is based on an ability of a respective link to convey the power from a power source over the respective link to the wireless base station.

26. The method as in claim 1, wherein a magnitude of a power limit value as specified by the power consumption information is based on an ability of a power source to provide the power through a link to the wireless base station.

27. The method as in claim 1, wherein adjusting the wireless communications from the wireless base station includes replacing a first wireless beam and a second wireless beam generated by the wireless base station with a third wireless beam conveying communications to the multiple mobile communication devices.

28. The method as in claim 1, wherein adjusting the wireless communications from the wireless base station includes replacing a single wireless beam transmitted from the wireless base station with multiple wireless beams transmitted from the wireless base station.

29. The method as in claim 1 further comprising:
monitoring a magnitude of current supplied to the wireless base station from a power source; and utilizing the magnitude of current as a basis to determine the amount of power consumed by the wireless base station.

30. The method as in claim 1, wherein utilizing magnitude of current as a basis to determine the amount of power consumed by the wireless base station includes multiplying the magnitude of current by a corresponding voltage supplying the power to the wireless base station.

31. The method as in claim 1, wherein the power consumed by the wireless base station includes a combination of wireless beam power transmitted from the wireless base station and base-band power used by the wireless base station to process communications.

* * * * *